(12) United States Patent  
Schmich et al.

(10) Patent No.: US 11,658,560 B2
(45) Date of Patent: May 23, 2023

(54) ENERGY SUPPLY SYSTEM FOR FEEDING A DC LINK, AND METHOD FOR OPERATING THE SYSTEM

(71) Applicant: SEW-EURODRIVE GMBH & CO. KG, Bruchsal (DE)

(72) Inventors: Patrick Schmich, Bretten (DE); Simon Zeller, Karlsdorf-Neuthard (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 0 days.

(21) Appl. No.: 17/625,978

(22) PCT Filed: Jun. 17, 2020

(86) PCT No.: PCT/EP2020/025289
§ 371 (c)(1),
(2) Date: Jan. 10, 2022

(87) PCT Pub. No.: WO2021/004655
PCT Pub. Date: Jan. 14, 2021

(65) Prior Publication Data
US 2022/0286037 A1 Sep. 8, 2022

(30) Foreign Application Priority Data
Jul. 10, 2019 (DE) .......................... 102019004756.7

(51) Int. Cl.
*H02M 1/00* (2006.01)
*H02M 3/04* (2006.01)
(52) U.S. Cl.
CPC ........... *H02M 1/0077* (2021.05); *H02M 3/04* (2013.01)

(58) Field of Classification Search
None
See application file for complete search history.

(56) References Cited

U.S. PATENT DOCUMENTS 6,115,269 A    9/2000  Gunnarsson
9,878,635 B1   1/2018  Khaligh
(Continued)

FOREIGN PATENT DOCUMENTS

DE    102011110197 A1    3/2012
DE    102011055134 A1    11/2012
(Continued)

OTHER PUBLICATIONS

International Preliminary Report on Patentability issued in corresponding International Application No. PCT/EP2020/025289 dated Jan. 11, 2022, pp. 1-10.

(Continued)

*Primary Examiner* — Jeffery S Zweizig
(74) *Attorney, Agent, or Firm* — Carter, DeLuca & Farrell LLP

(57) ABSTRACT

In a system for feeding a DC link and a method for operating the system, a sensor for detecting a current in the DC link or voltage on the DC link is connected to a controller, which activates a second converter, e.g., a DC/DC converter or current controller. A first energy storage device is connected via the second converter to the DC link, and the controller activates a third converter, e.g., a DC/DC converter or current controller. A second energy storage device is connected via the third converter to the DC link, and the first and the second energy storage devices are different, e.g., have a different dynamic behavior and/or different discharge time constants.

26 Claims, 1 Drawing Sheet

(56) References Cited

U.S. PATENT DOCUMENTS

| | | | |
|---|---|---|---|
| 10,594,207 B2 * | 3/2020 | Li .............................. | H02J 1/02 |
| 10,680,508 B2 * | 6/2020 | Wang ....................... | H02M 7/49 |
| 2015/0236504 A1 | 8/2015 | Takenaka | |
| 2019/0229609 A1 | 7/2019 | Li | |

FOREIGN PATENT DOCUMENTS

| | | |
|---|---|---|
| EP | 2654160 A1 | 10/2013 |
| JP | 2012165629 A | 8/2012 |
| WO | 2019006362 A1 | 1/2019 |

OTHER PUBLICATIONS

International Search Report issued in corresponding International Application No. PCT/EP2020/025289 dated Nov. 26, 2020, pp. 1-4, English Translation.

Moreno, V.M. et al., "A Comparative Analysis of Real-Time Algorithms for Power Signal Decomposition in Multiple Synchronous Reference Frames" IEEE Transactions on Power Electronics (Jul. 2007) pp. 1280-1289, vol. 22, No. 4.

* cited by examiner

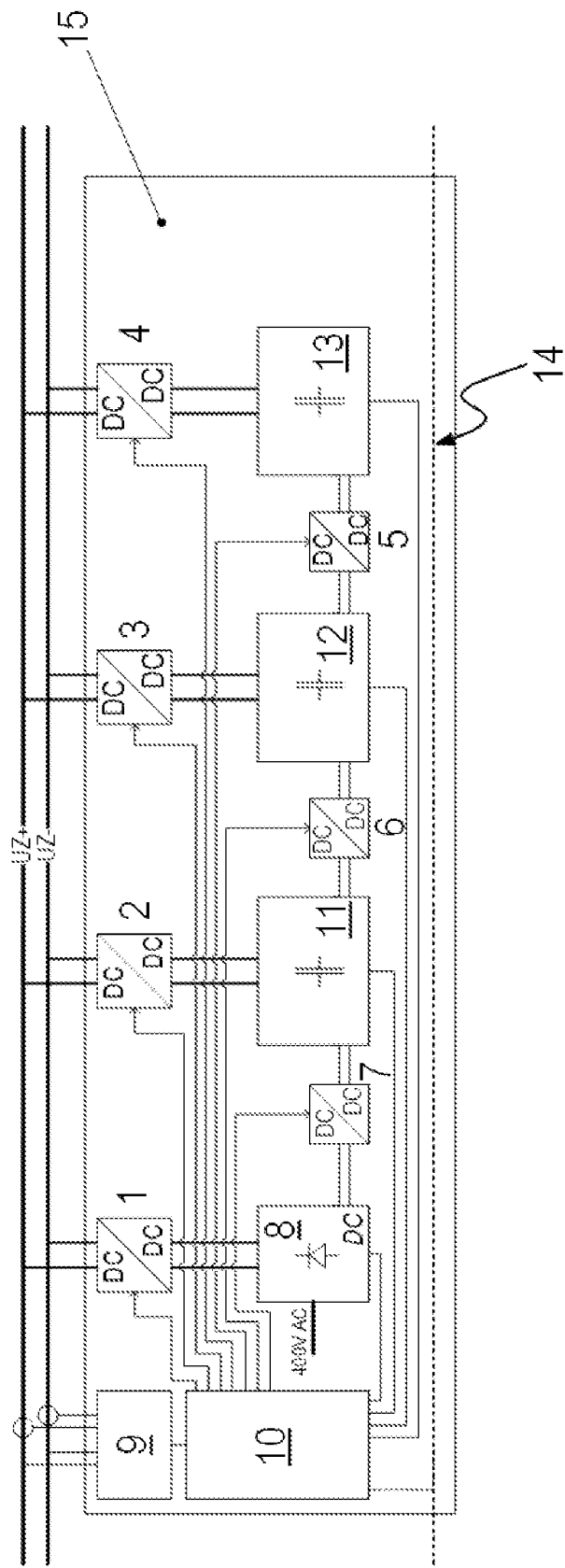

ENERGY SUPPLY SYSTEM FOR FEEDING A DC LINK, AND METHOD FOR OPERATING THE SYSTEM

FIELD OF THE INVENTION

The present invention relates to a system, e.g., an energy supply system, for feeding a DC link, and a method for operating a system.

BACKGROUND INFORMATION

In certain conventional systems, interference voltages can be present on a provided supply voltage.

SUMMARY

Example embodiments of the present invention provide a reduction of interferences.

According to an example embodiment of the present invention, in a system, e.g., an energy supply system, for feeding a DC link, a sensor for detecting a current in the DC link or a voltage on the DC link is connected to a controller which activates a second converter, e.g., a DC/DC converter or current controller, and a first energy storage device is connected via the second converter to the DC link. For example, the DC link is supportable by a first energy storage device via the second converter, and, for example, a first energy storage device is connected to the first connection of the second converter and the second connection of the second converter is connected to the DC link and/or the sensor. The controller activates a third converter, e.g., a DC/DC converter or current controller, and a second energy storage device is connected via the third converter to the DC link. For example, the DC link is supportable by a second energy storage device via the third converter, and, for example, a second energy storage device is connected to the first connection of the first converter and the second connection of the third converter is connected to the DC link and/or the sensor. The first and the second energy storage devices are different, e.g., have a different dynamic behavior and/or have different discharge time constants.

It is considered advantageous in this regard that interferences can be decreased. Interferences from a first frequency range are decreased by a first energy storage device, and interferences from another frequency range are decreased by a second energy storage device. This is because the two energy storage devices are configured differently and therefore have different speeds when discharging and also different speeds when charging. Each energy storage device is thus suitable for compensating, e.g., in the practical application only for decreasing, periodic interferences in different frequency ranges.

According to example embodiments, the controller activates a fourth converter, e.g., a DC/DC converter or current controller, and a second energy storage device is connected via the fourth converter to the DC link. For example, the DC link is supportable by a third energy storage device via the fourth converter, and, for example, a third energy storage device is connected to the first connection of the fourth converter and the second connection of the fourth converter is connected to the DC link and/or the sensor. The first, third, and the second energy storage devices are different, e.g., have a different dynamic behavior and/or have different discharge time constants. It is considered advantageous that various energy storage devices can be provided for various frequency ranges.

According to example embodiments, the first energy storage device has an accumulator, and the second energy storage device has an electrolyte capacitor or double-layer capacitor. It is considered advantageous that the accumulator supports steady components and low-frequency variations of the current or the voltage in the DC link. The accumulator has a high capacity in comparison to the two other types. However, the accumulator, for example, a lithium-ion accumulator, is too slow with respect to the dynamics during charging and during discharging to regulate out higher-frequency interferences.

According to example embodiments, the first energy storage device has an accumulator, the second energy storage device has an electrolyte capacitor, and the third energy storage device has a double-layer capacitor. It is considered advantageous that the accumulator supports steady components and low-frequency variations of the current or the voltage in the DC link. The accumulator has a high capacity in comparison to the two other types. However, the accumulator, for example, a lithium-ion accumulator, is too slow with respect to the dynamics during charging and during discharging to regulate out higher-frequency interferences.

Since the double-layer capacitor, e.g., an ultracap, has the highest dynamics, it is used to calm the highest-lying frequency range.

According to example embodiments, the controller activates a first converter, e.g., a DC/DC converter or current controller, which is fed from a supply module, which is connected to the first connection of the first converter, and the second connection of the first converter is electrically connected to the DC link, e.g., is connected to the DC link. For example, the supply module has a grid-fed rectifier. It is considered advantageous that the DC link is supportable. If the voltage or the current at or in the DC link falls below a critical threshold value, energy is fed from the supply module via the first converter into the DC link and the DC link is thus supported.

According to example embodiments, the controller activates a fifth converter, e.g., a DC/DC converter or current controller, from which the third energy storage device is chargeable. It is considered advantageous that if exclusively such high-frequency interferences are present that they can be compensated for by the third energy storage device, it is nonetheless avoided that the third energy storage device is not completely emptied.

According to example embodiments, the controller activates a sixth converter, e.g., a DC/DC converter or current controller, from which the second energy storage device is chargeable. It is considered advantageous that if exclusively such high frequency interferences are present that they can be compensated for by the second energy storage device, it is nonetheless avoided that the second energy storage device is not completely emptied.

According to example embodiments, the controller activates a seventh converter, e.g., a DC/DC converter or current controller, from which the first energy storage device is chargeable. It is considered advantageous that if exclusively such high-frequency interferences are present that they can be compensated for by the first energy storage device, it is nonetheless avoided that the first energy storage device is not completely emptied.

According to example embodiments, the fifth, sixth, and/or seventh converter is or are fed from the supply module. It is considered advantageous that the rectifier of the supply module feeds the first and the fifth, sixth, and seventh converter. A single grid-fed rectifier is thus sufficient.

According to example embodiments, the controller is connected by a data bus to a higher-order computer, e.g., for data exchange. It is considered advantageous that a prediction of the interferences is executable and the dynamics of the respective converter or energy storage device are adaptable in a timely manner matched thereto. This is because a higher-order controller specifies the movement sequences of mobile parts of a facility.

According to an example embodiment of the present invention, in a method for operating a system, chronologically recurring values of a physical variable, e.g., a current value in the DC link or a voltage on the DC link, are detected. In a first method step, a curve of the values detected in a first time span, e.g., a cycle time, is Fourier transformed, e.g., an FFT is carried out. In a second method step, at least one maximum, e.g., a local maximum, of the Fourier-transformed curve is determined and a first compensation signal directed to the frequency is determined and supplied to the DC link, e.g., by the first converter. In the first method step, the curve of the values detected in a second time span, e.g., a cycle time, is Fourier transformed, e.g., an FFT is carried out, and at least one maximum, e.g., a local maximum, of the Fourier-transformed curve of the curve detected in the second time span is determined and a second compensation signal directed to the frequency is determined and supplied to the DC link, e.g., by the second converter.

It is considered advantageous that the Fourier transform is readily executable by an FFT. The determination of the frequency associated with the maximum is also readily executable and thus the compensation signal for this frequency is determinable readily and without special calculation effort.

According to example embodiments, the first time span is longer than the second time span, and the first time span overlaps with the second time span. It is considered advantageous that the compensation signals of the different frequency ranges are determinable independently of one another. The compensation signals determined for short time spans are therefore updated faster than those determined for longer time spans.

According to example embodiments, in the first method step, the curve of the values detected in a third time span, e.g., a cycle time, are Fourier transformed, e.g., an FFT is carried out, and at least one maximum, e.g., a local maximum, of the Fourier-transformed curve of the curve detected in the third time span is determined and a third compensation signal directed to the frequency is determined and supplied to the DC link, e.g., by the third converter. For example, the third time span is shorter than the second time span. It is considered advantageous that the energy storage devices operating in various frequency ranges mutually supplement one another. Additionally, the compensation signal supplied by the respective energy storage device to the DC link in turn changes the detected values, since the sensor detects the voltage applied at the DC link or the current flowing in the DC link.

According to example embodiments, the respective compensation signal is selected in consideration of the dead time caused at least by the Fourier transform such that it counteracts a periodic interference associated with the maximum. It is considered advantageous that periodic interferences are suppressible. Complete suppression is not achievable only in the case of non-periodic interferences.

According to example embodiments, the method steps are repeated in a chronologically recurring manner with a respective time span which is selected such that the previously determined maximum has a minimum frequency spacing from the lower and upper limiting frequency. It is considered advantageous that the cycle time is adaptable and thus an adaptive learning system can be provided. In addition, the signal-to-noise ratio is improvable if the minimum frequency spacing is maintained.

Further features and aspects of example embodiments of the present invention are described in more detail below with reference to the appended schematic FIGURE.

BRIEF DESCRIPTION OF THE DRAWINGS

A system according to an example embodiment the present invention for providing and supporting a DC link is schematically illustrated in the FIGURE.

DETAILED DESCRIPTION

As schematically illustrated in the FIGURE, the system has a grid-fed supply module 8, which feeds a first connection of a converter 1, e.g., a bidirectionally operating DC/DC converter or current controller, in which the second connection of the converter 1 provides a DC link for consumers.

In addition, the DC link not only has line inductances, but also buffer capacitances. Such inductances and capacitances arranged distributed in the DC link result in the formation of resonance frequencies, which are excitable by the consumers in operation.

The excitation is to be suppressed using the system described herein.

The DC link has an upper potential UZ+ and a lower potential UZ−.

The supply module 8 is, for example, supplied from a public AC voltage supply grid, e.g., with a three-phase voltage.

The supply module 8, for example, has a rectifier, at the DC-voltage-side connection of which a capacitance is arranged for smoothing. The first connection of the converter 1 is supplied from this DC voltage. In addition, a series circuit formed from a resistor and a controllable semiconductor switch is connected in parallel to the first converter 1. If the voltage at the capacitance exceeds a threshold value, the controllable semiconductor switch is closed and energy is thus converted via the resistor into heat.

The converter 1 is activated by a controller 10 such that the actual value of the voltage (UZ+−UZ−) of the DC link detected using a sensor 9 is regulated down to a target value. The first converter 1 has a dynamic behavior having a first time constant.

A second converter 2 also activated by the controller 10 is connected by its first connection to a first energy storage device 11 and by its second connection to the DC link, in which the dynamic behavior of this energy storage device 11 together with the converter 2 has a second time constant, which is, e.g., less than the first time constant. For example, an accumulator arrangement, such as a lithium-ion accumulator, is usable as the first energy storage device.

A third converter 3 also activated by the controller 10 is connected by its first connection to a second energy storage device 12 and by its second connection to the DC link, in which the dynamic behavior of this energy storage device 12 together with the third converter 3 has a third time constant, which is, for example, less than the second time constant. For example, a capacitor arrangement, such as electrolyte capacitors, is usable as the second energy storage device.

A fourth converter 4 also activated by the controller 10 is connected by its first connection to a third energy storage device 13 and by its second connection to the DC link, in which the dynamic behavior of this energy storage device 13 together with the fourth converter 3 has a fourth time constant, which is, for example, less than the third time constant. For example, a double-layer capacitor arrangement, such as an ultracap arrangement, is usable as the third energy storage device.

The various energy storage devices 11, 12, 13 thus have different time constants in the support of the DC link. The third energy storage device 13 is provided for higher-frequency supports, e.g., for reducing high-frequency, e.g., periodic or quasiperiodic interferences. The two other energy storage devices 11, 12 are provided for lower-frequency interferences.

For example, each of the energy storage devices 11, 12, 13 is for the compensation of a frequency range assigned to the respective energy storage device 11, 12, 13. For example, the frequency ranges assigned to the respective energy storage devices 11, 12, 13 do not overlap one another.

The controller 10 generates an activation signal for each of the converters 1, 2, 3, 4, so that the converter provides the voltage determined by the controller and thus supplies the DC link.

The first converter 1 is activated such that power is supplied to the DC link from the first converter 1 when the voltage falls below a first threshold value. When the voltage exceeds a second threshold value, which is higher than the first threshold value, the controllable semiconductor switch of the supply module 8 is closed and power is thus dissipated from the DC link to the surroundings as heat.

A desired range of target voltage is thus achieved if no interference sources act which are higher-frequency than the first time constant of the first converter 1.

The second converter 2 is used to reduce periodic or quasiperiodic interferences which are in a first frequency band. For this purpose, the detected voltage curve is detected in a first time span, e.g., a cycle, and Fourier transformed, e.g., subjected to an FFT. The signal transformed in this manner is examined for maxima and/or peak values. Local maxima which stand out clearly from the noise are used as the basis for the determination of a compensation signal. For each determined maximum, a compensation signal is determined by back transformation and phase shift by 180°, which compensates for the periodic signal component of the frequency associated with the respective maximum, e.g., causes it to disappear.

The calculation effort for determining the compensation signal is low in the case of discretely sampled signals. Only the zero crossing of the periodic signal component of the frequency associated with respective maximum has to be determined, and the compensation signal is directly determinable with the same zero crossing but the inverted amplitude.

As described, the FFT is executed in a first time interval. In a following time interval, e.g., a following cycle of equal time length, the switching pattern determined as the activation signal for one or more controllable semiconductor switches of the second converter 2 is output by the controller 10 to the second converter and the compensation signal is thus introduced into the DC link.

The third converter 3 is used to reduce periodic or quasiperiodic interferences which are in a second frequency band. For this purpose, the detected voltage curve is detected in a first time span, e.g., a cycle, and Fourier transformed, e.g., subjected to an FFT. The first time span, e.g., cycle, is shorter than the first time span of the second converter 2. The signal transformed in this manner is examined for maxima and/or peak values. Local maxima which stand out clearly from the noise are used as the basis of the determination of a compensation signal. For each determined maximum, a second compensation signal is in turn determined by back transformation and phase shift by 180°, which compensates for the periodic signal component of the frequency associated with the respective maximum, thus causes it to disappear.

The compensation signal has a much higher frequency than the compensation signal calculated for the second converter 2.

The calculation effort for determining the compensation signal is low in the case of discretely sampled signals. Only the zero crossing of the periodic signal component of the frequency associated with respective maximum has to be determined and the compensation signal is directly determinable with the same zero crossing but the inverted amplitude.

As described, the FFT is executed in a first time interval. In a following time interval, e.g., a following cycle of equal time length, the switching pattern determined as the activation signal for one or more controllable semiconductor switches of the third converter 3 is output by the controller 10 to the third converter and the compensation signal is thus introduced into the DC link.

The second frequency band, for example, does not overlap with the first frequency band.

The fourth converter 4 is used to reduce periodic or quasiperiodic interferences which are in a third frequency band. For this purpose, the detected voltage curve is detected in a first time span, e.g., a cycle, and Fourier transformed, e.g., subjected to an FFT. The first time span, e.g., cycle, is shorter than the first time span of the third converter 3. The signal transformed in this manner is examined for maxima and/or peak values. Local maxima which stand out clearly from the noise are used as the basis of the determination of a third compensation signal. For each determined maximum, a third compensation signal is in turn determined by back transformation and phase shift by 180°, which compensates for the periodic signal component of the frequency associated with the respective maximum, thus causes it to disappear.

The third compensation signal has a much higher frequency than the compensation signal, e.g., the third compensation signal, calculated for the second converter 2.

The calculation effort for determining the compensation signal is low in the case of discretely sampled signals. Only the zero crossing of the periodic signal component of the frequency associated with respective maximum has to be determined and the third compensation signal is directly determinable with the same zero crossing but the inverted amplitude.

As described, the FFT is executed in a first time interval. In a following time interval, e.g., a following cycle of equal time length, the switching pattern determined as the activation signal for one or more controllable semiconductor switches of the fourth converter 4 is output by the controller 10 to the fourth converter and the fourth compensation signal is thus introduced into the DC link.

The third frequency band, for example, does not overlap with the second frequency band.

In the determination of the compensation signal, the zero crossing, e.g., the phase, is, for example, offset in time by an additional amount which corresponds to the dead time, which is required for detecting the actual value, the Fourier transform, and the further steps until the output of the switching pattern. For example, the dead times are of different lengths in the case of the first, second, and third compensation signal.

Since the detection of the voltage values or current values of the DC link is carried out centrally by the sensor 9 and the curve of the detected values is stored digitally and centrally in the controller 10, only the values thus present in the controller 10 have to be accessed for the determination of the respective compensation signals.

To prevent emptying of the energy storage devices 11, 12, 13, the converters 2, 3, 4 are adapted to be bidirectional. However, if the DC link substantially only has a single high-frequency interference, for example, emptying of the energy storage device 13 is possible.

To support the energy storage devices 11, 12, 13, the supply module 8 provides a further DC voltage which provides a charging voltage or a charging current via a respective converter 7, 6, 5 to a respective energy storage device 11, 12, 13 and thus complete emptying is prevented.

The DC voltage is, for example, provided via a further DC link.

The activation of the converters 7, 6, 5 also takes place from the controller 10.

The converters 7, 6, 5 are, for example, each configured as bidirectionally operating DC/DC converters or current controllers.

The first DC-voltage-side connection of the converter 7 is fed from a T node of the further DC link and is connected thereto. With its other connection, the converter 7 provides the energy storage device 11 and/or a charging circuit of the energy storage device 11 a charging current for charging the energy storage device.

The first DC-voltage-side connection of the converter 6 is fed from a T node of the further DC link and is connected thereto. With its other connection, the converter 6 provides the energy storage device 12 and/or a charging circuit of the energy storage device 12 a charging voltage for charging the energy storage device.

The first DC-voltage-side connection of the converter 5 is fed from a T node of the further DC link and is connected thereto. With its other connection, the converter 5 provides the energy storage device 13 and/or a charging circuit of the energy storage device 13 a charging voltage for charging the energy storage device.

The controller is connected by means of a data bus 14, e.g., an ethernet bus, to one or more further computers for data exchange.

In further exemplary embodiments, the respective first time span, e.g., the cycle time, is adapted if a maximum or one of the maxima after execution of the FFT is arranged close to the edge of the respective frequency band, e.g., close to the upper limiting frequency of the determinable Fourier spectrum, e.g., closer than a minimum frequency spacing from the edge of the frequency band.

This is because the Fourier spectrum is finite due to the discrete sampling, e.g., has a lower and upper limiting frequency. The frequency range between the upper and the lower limiting frequency is referred to as the frequency band.

LIST OF REFERENCE NUMERALS

1 converter, e.g., bidirectionally operating DC/DC converter or current controller
2 converter, e.g., bidirectionally operating DC/DC converter or current controller
3 converter, e.g., bidirectionally operating DC/DC converter or current controller
4 converter, e.g., bidirectionally operating DC/DC converter or current controller
5 converter, e.g., bidirectionally operating DC/DC converter or current controller
6 converter, e.g., bidirectionally operating DC/DC converter or current controller
7 converter, e.g., bidirectionally operating DC/DC converter or current controller
8 grid-fed supply module
9 sensor, e.g., for detecting the voltage and/or the current
10 controller
11 first energy storage device
12 second energy storage device
13 third energy storage device
14 data bus, e.g., ethernet bus

The invention claimed is:

1. A system for feeding a DC link, comprising:
a sensor adapted to detect a current in the DC link and/or a voltage on the DC link connected to a controller adapted to activate a second converter;
a first energy storage device connected via the second converter to the DC link;
wherein the controller is adapted to activate a third converter;
wherein a second energy storage device is connected via the third converter to the DC link;
wherein the first and second energy storage devices are different; and
wherein the controller is adapted to activate a fourth converter, and the second energy storage device is connected via the fourth converter to the DC link, the DC link is supportable by a third energy storage device via the fourth converter, the third energy storage device is connected to a first connection of the fourth converter, a second connection of the fourth converter is connected to the DC link and/or the sensor, and the first, third, and the second energy storage devices are different, have a different dynamic behavior, and/or have different discharge time constants.

2. The system according to claim 1, wherein the fourth converter is arranged as a DC/DC converter and/or a current controller.

3. The system according to claim 1, wherein the second energy storage device includes an electrolyte capacitor and the third energy storage device includes a double-layer capacitor.

4. The system according to claim 1, wherein the controller is adapted to activate a fifth converter, DC/DC converter, and/or current controller from which the third energy storage device is chargeable.

5. A system for feeding a DC link, comprising:
a sensor adapted to detect a current in the DC link and/or a voltage on the DC link connected to a controller adapted to activate a second converter;
a first energy storage device connected via the second converter to the DC link;
wherein the controller is adapted to activate a third converter;
wherein a second energy storage device is connected via the third converter to the DC link;
wherein the first and second energy storage devices are different; and
wherein the controller is adapted to activate a first converter fed from a supply module connected to a first connection of the first converter, a second connection of the first converter is electrically connected to the DC link, and the supply module includes a grid-fed rectifier.

6. The system according to claim 5, wherein the first converter is arranged as a DC/DC converter and/or a current controller.

7. The system according to claim 5, wherein the controller is adapted to activate a fifth converter from which the third energy storage device is chargeable, a sixth converter from which the second energy storage device is chargeable, and/or a seventh converter from which the first energy storage device is chargeable, and wherein the fifth, sixth, and/or seventh converter is adapted to be fed from the supply module.

8. A system for feeding a DC link, comprising:
   a sensor adapted to detect a current in the DC link and/or a voltage on the DC link connected to a controller adapted to activate a second converter;
   a first energy storage device connected via the second converter to the DC link;
   wherein the controller is adapted to activate a third converter;
   wherein a second energy storage device is connected via the third converter to the DC link;
   wherein the first and second energy storage devices are different; and
   wherein the controller is adapted to activate a sixth converter, DC/DC converter, and/or current controller from which the second energy storage device is chargeable.

9. A system for feeding a DC link, comprising:
   a sensor adapted to detect a current in the DC link and/or a voltage on the DC link connected to a controller adapted to activate a second converter;
   a first energy storage device connected via the second converter to the DC link;
   wherein the controller is adapted to activate a third converter;
   wherein a second energy storage device is connected via the third converter to the DC link;
   wherein the first and second energy storage devices are different; and
   wherein the controller is adapted to activate a seventh converter, DC/DC converter, and/or current controller from which the first energy storage device is chargeable.

10. A system for feeding a DC link, comprising:
    a sensor adapted to detect a current in the DC link and/or a voltage on the DC link connected to a controller adapted to activate a second converter;
    a first energy storage device connected via the second converter to the DC link;
    wherein the controller is adapted to activate a third converter;
    wherein a second energy storage device is connected via the third converter to the DC link;
    wherein the first and second energy storage devices are different; and
    wherein the controller is connected by a data bus to a higher-order computer.

11. The system according to claim 10, wherein the system is arranged as an energy supply system.

12. The system according to claim 10, wherein the second converter and/or the third converter is arranged as a DC/DC converter and/or a current controller.

13. The system according to claim 10, wherein the DC link is supportable by the first energy storage device via the second converter and/or by the second energy storage device via the third converter.

14. The system according to claim 10, wherein (a) the first energy storage device is connected to a first connection of the second converter and a second connection of the second converter is connected to the DC link and/or the sensor and/or (b) the second energy storage device is connected to a first connection of the third converter and a second connection of the third converter is connected to the DC link and/or the sensor.

15. The system according to claim 10, wherein the first and second energy storage devices have a different dynamic behavior and/or different discharge time constants.

16. The system according to claim 10, wherein the first energy storage device includes an accumulator and the second energy storage device includes an electrolyte capacitor and/or a double-layer capacitor.

17. A method for operating a system, comprising:
    (a) detecting chronologically repeating values of a physical variable;
    (b) performing a Fourier transformation on a curve of the values detected in a first time span and on a curve of the values detected in a second time span;
    (c) determining at least one maximum of the Fourier-transformed curve of the values detected in the first time span;
    (d) determining a first compensation signal directed to frequency;
    (e) supplying the first compensation signal to a DC link;
    (f) determining at least one maximum of the Fourier-transformed curve of the values detected in the second time span;
    (g) determining a second compensation signal directed to frequency; and
    (h) supplying the second compensation signal to the DC link.

18. The method according to claim 17, wherein the physical variable includes a current value in and/or a voltage on the DC link, the first time span includes a first time cycle, the second time span includes a second time cycle, each of the at least one maximums includes a local maximum, the first compensation signal is supplied to the DC link by a first converter, the second compensation signal is supplied to the DC link by a second converter, and the Fourier transformation includes a fast Fourier transformation (FFT).

19. The method according to claim 17, wherein the first time span is longer than and overlaps with the second time span.

20. The method according to claim 17, further comprising:
    performing a Fourier transformation on a curve of the values detected in a third time span;
    detecting at least one maximum of the Fourier-transformed curve of the values detected in the third time span;
    determining a third compensation signal directed to frequency; and
    supplying the third compensation signal to the DC link.

21. The method according to claim 20, wherein the Fourier transformation performed on the curve of the values detected in the third time span includes a fast Fourier transformation (FFT), the at least one maximum of the Fourier-transformed curve of the values detected in the third time span includes a local maximum, and the third compensation signal is supplied to the DC link by a third converter.

22. The method according to claim 20, wherein the third time span is shorter than the second time span.

23. The method according to claim 17, wherein a respective compensation signal is selected in consideration of dead time caused at least by the Fourier transformation to counteracts a periodic interference associated with the maximum.

24. The method according to claim 17, wherein the steps (a) to (h) are repeated in a chronologically recurring manner with a respective time span such that a previously determined maximum has a minimum frequency spacing from lower and upper limiting frequencies.

25. A system for feeding a DC link, comprising:
- a sensor adapted to detect a current in the DC link and/or a voltage on the DC link connected to a controller adapted to activate a second converter;
- a first energy storage device connected via the second converter to the DC link;
- wherein the controller is adapted to activate a third converter;
- wherein a second energy storage device is connected via the third converter to the DC link; and
- wherein the first and second energy storage devices are different; and
- wherein system is adapted to perform a method for operating the system, including:
  - (a) detecting chronologically repeating values of a physical variable;
  - (b) performing a Fourier transformation on a curve of the values detected in a first time span and on a curve of the values detected in a second time span;
  - (c) determining at least one maximum of the Fourier-transformed curve of the values detected in the first time span;
  - (d) determining a first compensation signal directed to frequency;
  - (e) supplying the first compensation signal to the DC link;
  - (f) determining at least one maximum of the Fourier-transformed curve of the values detected in the second time span;
  - (g) determining a second compensation signal directed to frequency; and
  - (h) supplying the second compensation signal to the DC link.

26. A method for operating a system for feeding a DC link, the system including a sensor adapted to detect a current in the DC link and/or a voltage on the DC link connected to a controller adapted to activate a second converter, and a first energy storage device connected via the second converter to the DC link, the controller being adapted to activate a third converter, a second energy storage device being connected via the third converter to the DC link, the first and second energy storage devices being different, comprising:
- (a) detecting chronologically repeating values of a physical variable;
- (b) performing a Fourier transformation on a curve of the values detected in a first time span and on a curve of the values detected in a second time span;
- (c) determining at least one maximum of the Fourier-transformed curve of the values detected in the first time span;
- (d) determining a first compensation signal directed to frequency;
- (e) supplying the first compensation signal to the DC link;
- (f) determining at least one maximum of the Fourier-transformed curve of the values detected in the second time span;
- (g) determining a second compensation signal directed to frequency; and
- (h) supplying the second compensation signal to the DC link.

* * * * *